July 26, 1966　　　E. T. JAGGER ETAL　　　3,263,011
MOULDING ARTICLES
Filed April 18, 1962　　　　　　　　　　　　　　4 Sheets-Sheet 2
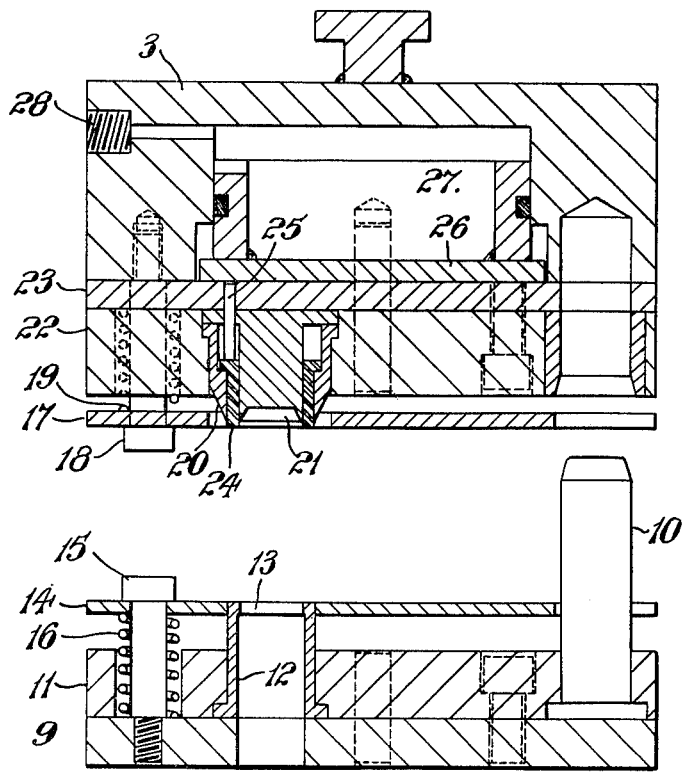
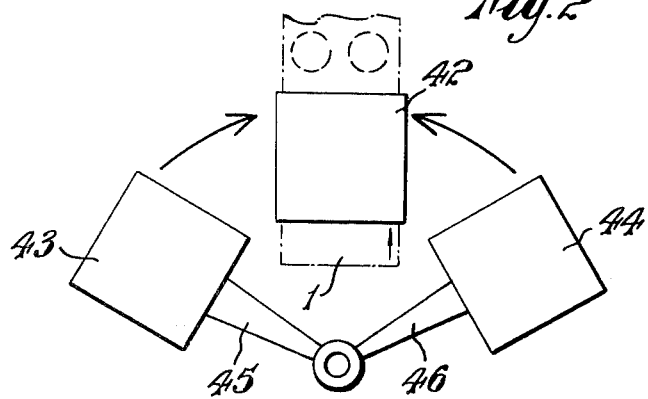

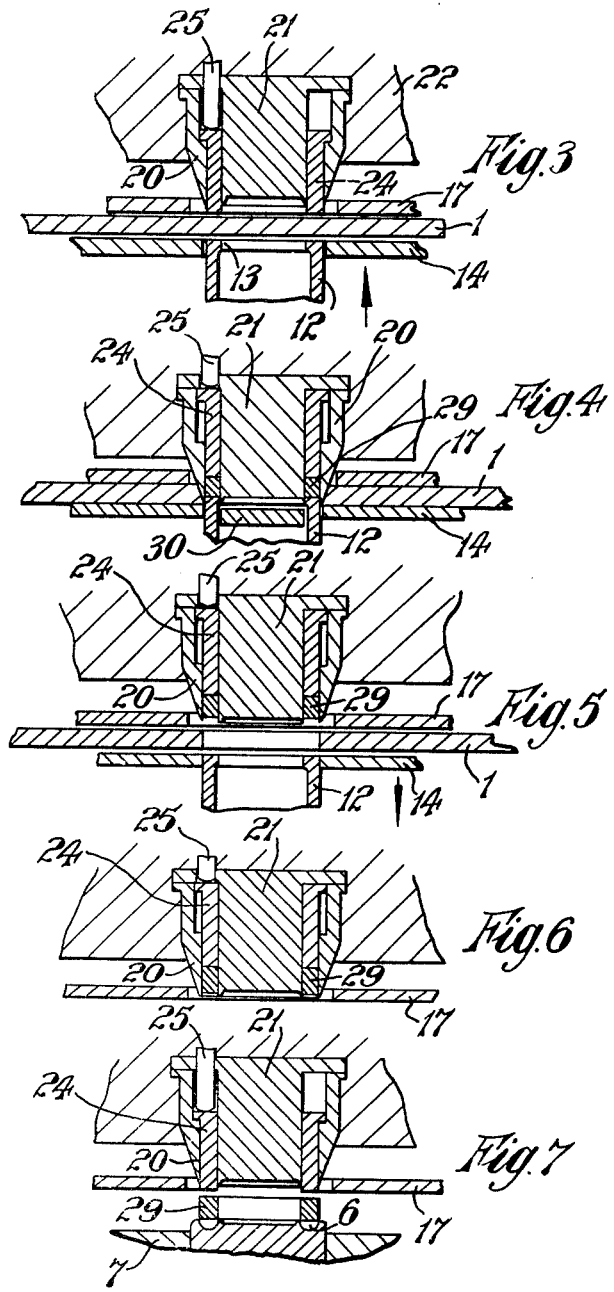

3,263,011
MOULDING ARTICLES
Ernest T. Jagger and Edward I. Hunter, Newcastle-upon-Tyne, England, assignors to George Angus & Company Limited, Newcastle-upon-Tyne, England
Filed Apr. 18, 1962, Ser. No. 188,307
Claims priority, application Great Britain, Apr. 24, 1961, 14,714/61
6 Claims. (Cl. 264—153)

This invention relates to moulding articles from rubber or like material and more especially rubber rings of circular cross-section known as O-rings and used as fluid-tight seals in machinery and mechanical couplings or other joints.

The invention is however applicable to the moulding of other articles from plastic material.

By "plastic material" is meant material which is in a plastic condition, like an unvulcanised rubber composition, and from which blanks can be cut and moulded into articles.

The material from which the articles are to be moulded is prepared, by known methods, as a stock of material in plastic condition, preferably in the form of a web, such as a strip or sheet, and the invention provides a method of forming blanks from the stock and transferring them to moulding die members, which method can be carried out by automatic mechanism at a much higher rate than equivalent operations could be performed manually.

According to the invention, a method of moulding articles from blanks of plastic material which are placed in moulding die members, comprises the steps of forming blanks from a stock of plastic material, retaining the blanks in part of the means by which they are formed, effecting relative movement between said part and the die members and then transferring the blanks from said part to the die members.

In the preferred way of carrying the invention into effect, the die members are multiple cavity die members, the blanking means forms blanks corresponding in number and relative position to the cavities of the die members and the transfer part of the blanking means transfers the blanks without change in their relative position.

In a further development of the method of the invention, one set of blanking means is arranged to serve two or more sets of die members successively so that while moulding is being effected in one set of die members the blanking means is forming and transferring blanks to another set of die members.

Conveniently, the transfer part of the blanking means is a part which cuts blanks from the stock and retains them for transfer to the die members.

Preferably the stock material is in the form of a long preformed, or continuously formed, strip or other web which is fed step-by-step past the blanking means and the relative movement and blank-transfer operation of the transfer part of the blanking means is effected cyclically in synchronism with the feed of the web.

The stock could however be fed to the blanking means in other form, for example as a relatively large cross-section extruded rod from which transverse slices are cut and fed to the blanking means.

Preferably, the stock of plastic material is thrust against the transfer part of the blanking means to effect formation of the blanks and is then moved away therefrom, this method requiring the transfer part to have only a simple movement, between the blanking and die-loading positions, and not an additional movement to effect the blanking.

Stock material remaining after blanks have been formed can be recovered and reconstituted for re-use, this being a known practice when using such stock material as an unvulcanised rubber composition, either natural or synthetic, with which the invention is especially concerned.

The invention will be further described with reference to the accompanying drawings, in which:

FIG. 2 is an axial section through blank-forming mechanism.

FIGS. 3 to 7 are fragmentary axial sections of a blank-forming unit of the mechanism of FIG. 2, showing successive stages in the operation thereof.

FIG. 11 is a diagrammatic plan of a further alternative lay-out.

Figure 1:
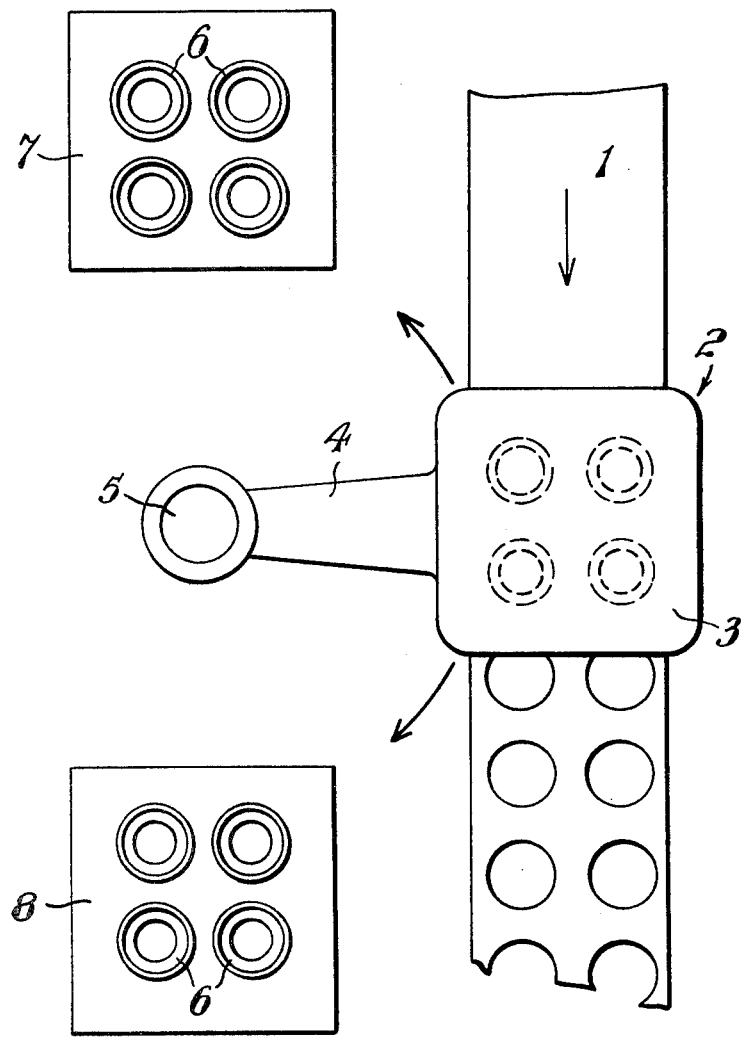
FIG. 1 is a somewhat diagrammatic plan of one lay-out of mechanism for carrying out the invention.

In FIG. 1 there is shown a strip web 1 of unvulcanised rubber composition which is fed step-by-step through blanking means, generally indicated as 2, and having an upper part 3 which is carried by an arm 4 pivoted on a post 5 so that formed blanks held in the part 3 can be transferred, by swinging of the arm 4, to the cavities 6 of either of two multiple cavity lower die members 7 and 8.

The operations comprising the feeding movement of the web 1, the actuation of the blanking means 2, the swinging of the arm 4, the deposit of blanks in the cavities 6, the closing of upper die members (not shown) on to the lower members 7 and 8 and the subsequent opening, unloading and cleaning of the die members are all effected and timed by automatically controlled mechanism, for example pneumatic or other mechanism controlled by a master cam shaft. Suitable components for such mechanism are known and commercially available, being used in other kinds of automatic machinery, and as in themselves they do not form part of the present invention they need not be more fully described.

The blanking mechanism 2 is shown more fully by FIG. 2 and the operating sequence thereof by FIGS. 3 to 7.

The upper part 3 mentioned above is an upper bolster which, at each blanking operation, registers with a lower bolster 9 through guide pillars 10 of which one is shown in FIG. 2.

The lower bolster 9 is carried by the head of an upwardly-acting press, which is not shown and may be, for example, a pneumatic or hydraulic press, so as to be moved up to and down from the upper bolster at each blanking operation.

The rubber web 1 extends between step-by-step feed rollers, not shown, or other feed mechanism, so that its path lies between the bolsters and it has sufficient play to be sandwiched between the bolsters at each blanking operation.

Secured on the lower bolster 9, by a holding plate 11, are four tubular pommels 12 of which only one appears in FIG. 2 but which correspond in number and relative position to the die cavities 6 in the die members.

Each pommel 12 has an inner peripheral lip flange 13, so as to be of slightly enlarged bore below the flange, and is surrounded with a sliding clearance by the periphery of a respective aperture in a lower stripper plate 14 vertically movable on and retained by guide studs 15 around which helical compression springs 16 constantly urge the stripper plate 14 upwardly for the purpose of stripping the web 1, apertured after blanking, from the pommels 12 as described later.

On the underside of the upper bolster 3 a corresponding apertured upper stripper plate 17 is retained by guide studs 18 and constantly urged downwardly by springs 19.

Into each aperture of the upper stripper plate 17 there depend coaxially an outer ring knife 20 and an inner cylindrical knife 21 which are fixed to the underside of the upper bolster 3, by mounting plates 22 and 23. The annulus between the two knives defines the shape of a ring blank to be cut from the rubber web 1.

In the annulus between the two knives there slides an ejector sleeve 24, retained by flanged engagement inside the ring knife 20, and on the ejector sleeve bears a thrust pin 25 which extends freely upwardly through a hole therefor in the mounting plate 23 for abutment with a piston 26.

The piston 26 slides in a cylinder 27, formed in the upper bolster 3 and closed by the mounting plate 23, intermittently supplied with compressed air through a port 28. When the cylinder 27 is not under pressure, the piston 26 can slide upwardly under the thrust of the pins 25 moved by the ejector sleeves 24 encountering the pommels 12 on upward stroke of the lower bolster 9. After transfer swinging of the bolster 3, supply of compressed air to the cylinder 27 will thrust the piston 26 downwardly to actuate the ejector sleeves 24 for loading blanks into die cavities 6. Exhaust and admission of compressed air to and from the cylinder 27 is controlled in synchronism with the strokes of the lower bolster 9 and transfer swinging of the upper bolster 3 to the die members.

The sequence of operation of the mechanism 2 described above can be seen from FIGS. 3 to 7.

In FIG. 3, the rubber web 1 is shown stopped between the bolsters with the lower bolster having moved up to approach the web 1 to the knives 20 and 21.

In FIG. 4, the lower bolster has completed its upward stroke and started to return downwardly. The knives, shearing outside and inside the pommel 12, have cut from the web 1 a ring blank 29 from the centre of which a core 30 has started to fall through the tubular pommel for collection and re-use. Should the core 30 tend to stick to the plunger knife 21, the flange 13 acts as a stripper therefor. The lower stripper plate 14 is thrusting the now-apertured web 1 from the pommel and the upper stripper plate 17 is thrusting the apertured web from the ring knife 20. The cylinder 27 is not under pressure and consequently the blank 29 has been able to lift the ejector sleeve 24 and remain held in the annulus between the knives.

In FIG. 5, the downward stroke of the bolster 9 has been completed, the upper stripper plate 17 has cleared the web 1, the blank 29 is still held between the knives, with the ejector sleeve raised, and the bolster 3 is ready for the arm 4 to swing and transfer the bolster holding the blanks, in the condition shown by FIG. 6, to a position in register above one of the lower die members, such as 7.

In FIG. 7, the bolster 3 has registered above the respective die member 7, compressed air has been admitted to the cylinder 27 and the piston 26 has thrust on the pin 25 to move the ejector sleeve 24 downwardly between the knives and load the blank 29 into a die cavity 6.

Meanwhile, the lower bolster 9 has remained in its lower, FIG. 5, position and the web 1 has been fed forward one step to bring a fresh portion between the bolsters.

The arm 4 is now swung back to the position of FIG. 1, the cylinder 27 is vented and the cycle of operation of the mechanism 2 is repeated to load the other die member 8 while the moulding operation is being completed in the die member 7 on to which its upper member has closed.

FIGS. 8 to 11 show diagrammatically examples of alternative arrangements of equipment with which the method of the invention could be carried out.

Figure 8:
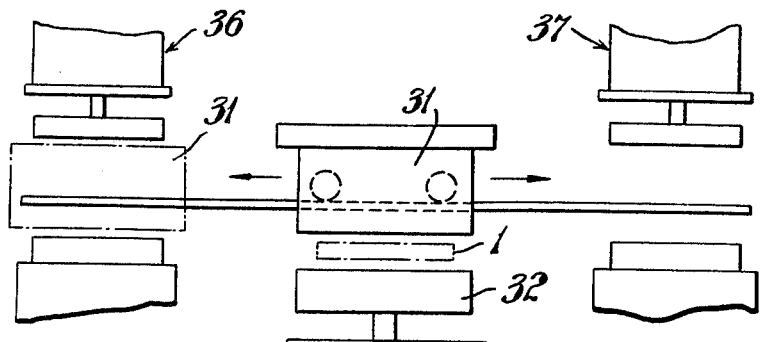
FIGS. 8 and 9 are respectively a diagrammatic side elevation and plan of an alternative lay-out of mechanism for carrying out the invention.
Figure 9:
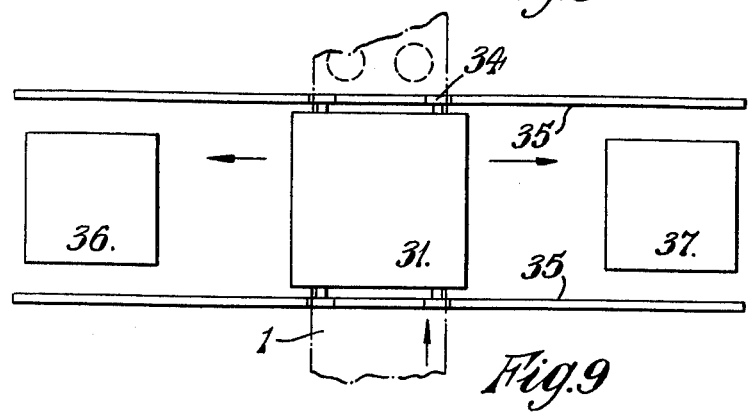

In FIGS. 8 and 9, the blanking means comprises a carriage 31, containing mechanism similar to that in the upper bolster 3 of the apparatus described above, with which co-operates a vertically movable lower bolster 32, similar to the lower bolster 9 with pommels and associated parts, carried by a pneumatic or hydraulic ram 33, or similar lifting means, operated cyclically to effect similar operations to those effected by vertical reciprocation of the bolster 9.

The carriage 31 is mounted by wheels 34 on track rails 35 to travel, suitably driven, either way to transfer and load blanks into cavities of either of two sets 36 and 37 of die-carrying moulding members.

Figure 10:
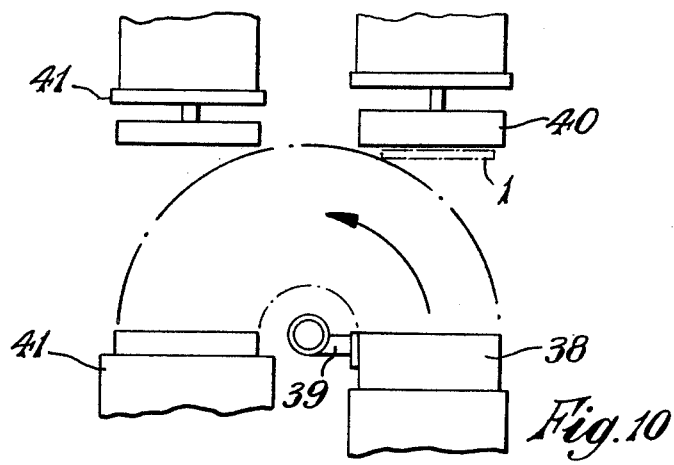
FIG. 10 is a diagrammatic side elevation of another alternative lay-out.

In FIG. 10, a lower bolster 38, with blank forming and holding mechanism similar to that of the above-described upper bolster 3, is carried by a horizontal-axis swinging arm 39 to alternate in position between a blank-forming position, in which a reciprocating upper bolster 40, equivalent to the bolster 9, brings the rubber web 1 down into blanking position and then returns upwardly, and a die-loading position in which blanks are loaded into the cavities of a lower die member of a moulding set 41. The moulding set 41 may be one of several such sets carried by a turntable and successively brought into position and stopped for loading while the operations of moulding, unloading and die-cleaning are carried out at other stations in rotation of the turntable.

In FIG. 11, stationary blanking means 42, comprising upper and lower relatively reciprocating parts equivalent to the bolsters of the mechanism 2, form blanks and load them into cavities of lower die members 43 or 44 carried respectively by arms 45 and 46 which may be swinging arms, returning to and from fixed position upper die members, or may be spoke arms of a vertical axis rotary multiple moulding machine the moulding sets of which pass the blanking means 42 in turn to be loaded with blanks, the remaining operations of moulding, unloading and die-cleaning being carried out at other stations in rotation of the machine.

We claim:

1. In a method of moulding articles from blanks of plastic material which are moulded within a set of moulding die members, there being provided a set of blank-forming means at a first location and a set of upper and lower moulding die members both located at a second location laterally displaced from said first location, the steps comprising: effecting relative movement of the blank-forming means and a stock of plastic material at said first location so as to form blanks from said material, retaining said blanks in one blank-forming part of the blank-forming means, effecting relative lateral movement between said one blank-forming part of the blank-forming means and at least one die member of said set so as to bring said one blank-forming part and said one die member into alignment, releasing said blanks from said one blank-forming part and depositing them directly onto said one die member of said set, effecting a further relative movement between said one blank-forming part and said one die member so as to move said one blank-forming part and said one die member out of alignment with each other and so as to place said one blank-forming part at said first location and so as to place said one die member in alignment with the other die member of said set at a location displaced laterally from said first location, closing said set of die members to effect moulding of said blanks, opening said die members, and removing said moulded articles from said die members.

2. A method as claimed in claim 1 wherein said further relative movement places said one die member at said second location.

3. A method as recited in claim 2 wherein a second set of die members is provided at a third location, comprising the further steps of effecting relative movement of the blank-forming means and a stock of plastic material at said first location so as to form further blanks from said material, retaining said further blanks in said one blank-forming part, effecting relative movement between said one blank-forming part and at least one die member of said second set of die members so as to bring said one blank-forming part and said one die member of said second set into alignment, releasing said blanks from said one blank-forming part and depositing them directly onto said one die member of said second set, effecting relative movement between said one blank-forming part and said one die member of said second set so as to move said one blank-forming part and said one die member of said second set out of alignment and so as to place said one blank-forming part at said first location and said one die member of said second set at said third location in alignment with the other die member of said second set, and closing said second set of die members to effect moulding of said further blanks.

4. A method according to claim 1, in which said die members are multiple cavity die members, said blanking means is operated to form blanks corresponding in number and relative position to the cavities of said die members and said part of said blanking means is operated to transfer blanks without change in their relative position.

5. A method according to claim 2, in which said stock of plastic material is in the form of a web, said web is fed step-by-step past said blanking means and said relative movement and blank transfer operation of said part of said blanking means is effected cyclically in synchronism with said feed of said web.

6. A method according to claim 1, in which said stock of plastic material is thrust against said part of said blanking means for blanks to be formed therefrom and then moved away from said part.

References Cited by the Examiner

UNITED STATES PATENTS

| | | |
|---|---|---|
| 1,607,074 | 11/1926 | Gros. |
| 1,801,085 | 4/1931 | Humphrey. |
| 2,593,439 | 4/1952 | Gora _____ 264—153 |
| 2,646,595 | 7/1953 | Leistensnider. |
| 2,657,426 | 11/1953 | Gora. |
| 2,798,257 | 7/1957 | Blare. |
| 2,864,123 | 12/1958 | Gora. |
| 3,015,843 | 1/1962 | Gora. |

ROBERT F. WHITE, *Primary Examiner.*

WILLIAM J. STEPHENSON, *Examiner.*

R. B. MOFFITT, *Assistant Examiner.*